March 7, 1933.  C. H. FEHLBERG  1,899,950
FREE WHEELING TRANSMISSION
Filed Feb. 8, 1932
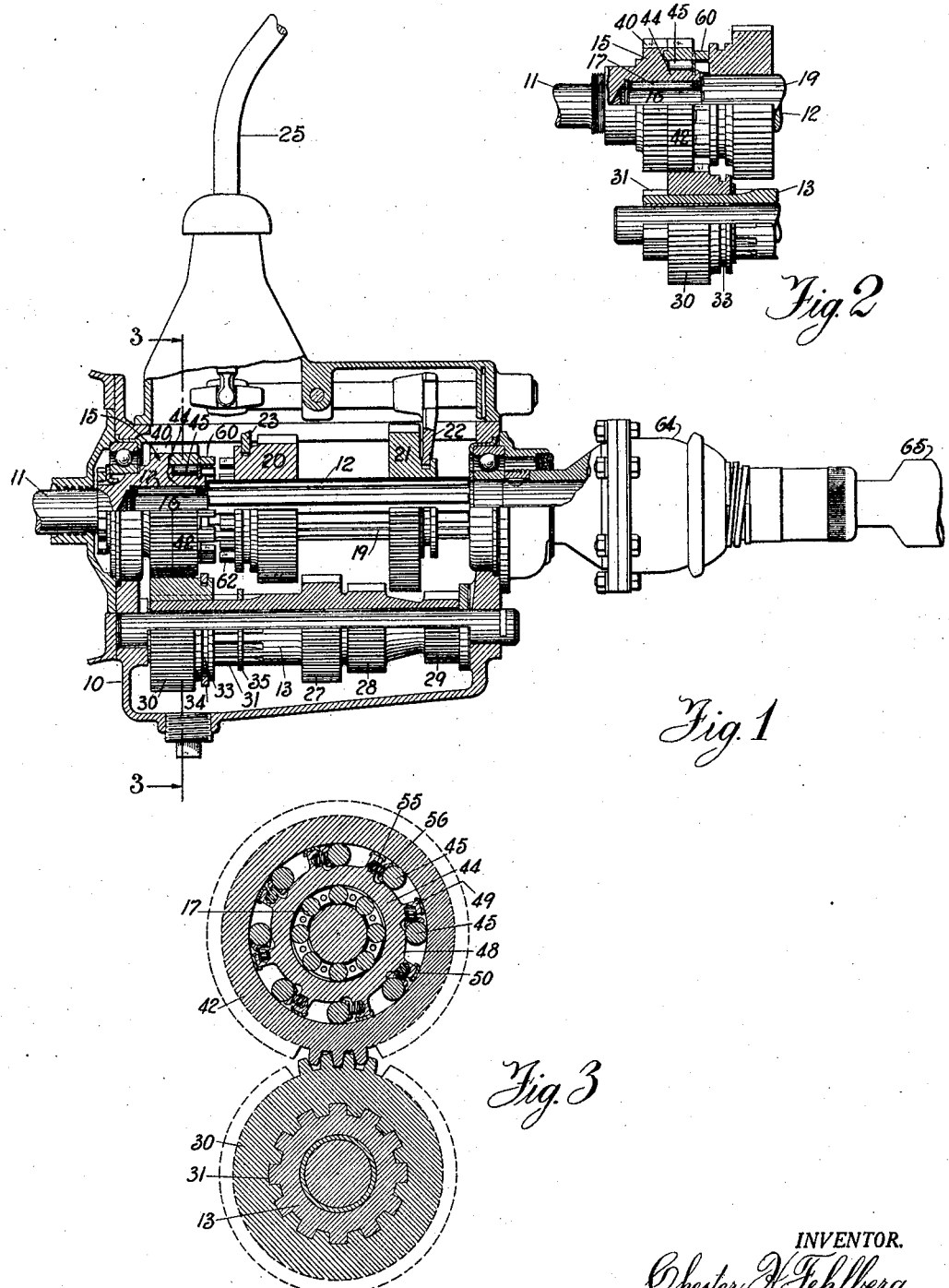

Patented Mar. 7, 1933

1,899,950

UNITED STATES PATENT OFFICE

CHESTER H. FEHLBERG, OF SOUTH BEND, INDIANA, ASSIGNOR, BY MESNE ASSIGNMENTS, TO FREE WHEELING PATENTS CORPORATION, OF SOUTH BEND, INDIANA, A CORPORATION OF DELAWARE

FREE WHEELING TRANSMISSION

Application filed February 8, 1932. Serial No. 591,598.

This invention relates to a free wheeling transmission for an automotive vehicle, and has for its principal object the provision of such a transmission in which the free wheeling unit is incorporated in the transmission and in which the control of the free wheeling unit to provide free wheeling or positive drive is separate from the shift lever of the transmission.

A further object is the provision of a free wheeling transmission of the character described in which free wheeling may be obtained in all forward speeds and also in reverse, and in which the operation of the reverse gear does not necessitate locking-out of the free wheeling function of the transmission.

A still further object is the provision of a device of the character described which is simple in construction and easy to operate, and it is also an object to provide a device of the character indicated above which is simple in construction, easy to install and which will not readily get out of order in use.

Other objects and advantages will appear as the description proceeds.

A single embodiment of the invention is illustrated in the accompanying drawing. The drawing, however, is not to be taken as limiting the invention, the scope of which is to be measured solely by the scope of the copending claims.

In the drawing:

Figure 1 is a vertical cross sectional view of a transmission showing a free wheeling unit constructed according to the idea of this invention incorporated therein, and showing the slidable gear on the countershaft in a position to provide positive drive.

Figure 2 is a detailed view showing the operation of the free wheeling unit and showing the sliding gear on the countershaft in a position to permit free wheeling.

Figure 3 is a cross sectional view of the line 3—3 of Figure 1 showing the gear on the engine shaft and the slidable gear on the countershaft and also showing the construction of the free wheeling clutch between onehalf of the gear on the engine shaft and a cylindrical portion of the engine shaft.

Referring to the drawing in detail, the numeral 10 indicates a transmission casing in which are mounted by means of suitable bearings, the end of a clutch or engine shaft 11, a transmission shaft 12, and a countershaft 13. A driving gear generally indicated at 15 is formed upon the end of the engine shaft 11 and the transmission shaft 12 is rotatably mounted coaxially within this gear by means of a reduced portion 16 and antifriction rollers 17. Speed changing gears 20 and 21 are slidably mounted on the transmission shaft 12 and non-rotatably secured thereon by means of splines 19. These gears are movable along the transmission shaft by means of the shifter forks 22 and 23 actuated by the usual shift lever 25. Change-speed gears 27 and 28 and reverse gear 29 are mounted upon the countershaft 13 and the gears 20 and 21 are adapted to mesh with these gears to provide speed changes and a reverse of direction for the vehicle.

A gear 30 is slidably mounted upon the forward end of the countershaft 13 and is non-rotatably secured thereon by means of splines 31. This gear is provided with a groove 33 and is shiftable longitudinally on the countershaft by means of a shifter fork 34 fitting into the grove 33. A ring member 35 mounted on the countershaft defines one limiting position of the gear 30, the other limiting position being defined by the abutment of the gear 30 against the front wall of the casing 10, or a ring similar to ring 35 may be fitted on the front end of the countershaft. The gear 15 with which the gear 30 meshes is formed of two parts 40 and 42, the part 40 being formed integrally with the engine shaft 11. The part 42 of the gear generally indicated at 15 is mounted upon an extension 44 of the gear 40 or engine shaft 11, and rollers 45 are interposed between the extension 44 and the portion 42 of the gear 15.

From an inspection of Figure 3, it will be observed that the extension 44 is formed as a cam element, having cam surfaces 48 separated by radial extensions 49. The radial extensions 49 are each capped with an element 50 of bearing material and these radial extensions form a bearing surface for the portion 42 of the gear 15.

Again referring to Figure 3, it will be observed that each of the cam surfaces 48 is deeper at one end than at the other and that a roller 45 is positioned in each of these cam surfaces or pockets and is of such a dimension that it will lie wholly within the deeper end of the pocket, but when in a position toward the shallow end of the pocket will wedge between the cam surface 48 and the inner surface of the element 42 of the gear 15 to lock the element 42 upon the cam member 44. One end of a compression spring 55 is inserted in an aperture provided in each of the radial extensions 49, the other end of the springs bearing against the guides 56 which in turn bear against rollers 45. The action of the compression springs is to urge the rollers away from the radial extensions 49 toward the shallow end of the pockets 48.

The gear element 42 is also provided at the side adjacent to the gear 20 with clutch teeth 60 and the gear 20 carries complementary clutch teeth 62 to provide a direct driving connection between the element 42 and the gear 20.

At the rear end of the transmission there is provided the usual universal joint 64 and propeller shaft 65.

The operation of the device is as follows:

It will be observed that the element 40 is integral with the shaft 11 and will rotate with this shaft in one direction to positively drive the meshing gear 30. The element 42 which is mounted upon the shaft 11 by means of a one-way clutch comprising the cam member 44 and rollers 45 will be driven by the shaft 11 in one direction but will overrun the shaft in the opposite direction. The gear 30 is movable upon the countershaft 13 along the splines 31 by means of the groove 33 and a shifter fork 34. This gear 30 has two operative positions, one in which it meshes with both the element 40 and the element 42 of the gear generally indicated at 15, and the other in which it meshes only with the element 42 which is the free wheeling or the overrunning element of the gear 15. In the first position the gear 30 will serve to lock the two elements 40 and 42 together and give a positive drive in all speeds of the transmission including reverse. In the second position power will be transmitted solely through the element 42 and an overrunning drive will be obtained in all forward speeds and also in the reverse speed of the transmission. This function will occur whether the drive is through the gear 30 or whether it is directly through the inter-meshing teeth 60 and 62 from element 42 to the gear 20.

Having now described my invention so that others skilled in the art may clearly understand the same, what I desire to secure by Letters Patent is as follows.

What I claim:

1. In a vehicle transmission, a drive shaft, a transmission shaft, a countershaft, driving means on said drive shaft, and means slidably but non-rotatably mounted on said countershaft engageable with said driving means, said slidable means being movable to one position to provide a one-way drive for the vehicle and movable to another position to provide a two-way drive for the vehicle.

2. In a vehicle transmission having a drive shaft, a transmission shaft in alignment with the drive shaft, and a countershaft, means for providing a one-way or a two-way drive from said drive shaft to said transmission shaft comprising, one-way driving means and two-way driving means interposed in the drive between said drive shaft and said transmission shaft, and a gear slidable but non-rotatable on said countershaft selectively operatively engageable with said two-way drive means or said one-way drive means for rendering said first named means a one-way or a two-way driving connection.

3. In a vehicle transmission, a drive shaft, a driven shaft, a pair of abutting coaxial driving gears of the same pitch diameter on one of said shafts, a countershaft, means providing a one-way drive for one of said gears, and means on said countershaft for locking said gears together to render said one-way drive ineffective.

4. In a vehicle transmission, a drive shaft, a transmission shaft, a countershaft, means providing one-way or a two-way driving connection between said drive shaft and said transmission shaft, and a gear on said countershaft comprising an element of said first named means movable relative to said countershaft to selectively provide said one-way or two-way drive.

5. In a vehicle transmission, a pair of aligned shafts, a third shaft parallel to said aligned shafts, means to provide a one-way or a two-way drive between said aligned shafts, and a gear on said third shaft operatively engageable with said drive means to selectively provide said one-way or two-way drive.

6. In a vehicle transmission, a drive shaft, a transmission shaft, a countershaft, a two-part gear on said drive shaft, one-way drive means between one part of said two-part gear and said drive shaft, and a gear slidably but non-rotatably mounted on said countershaft adapted to mesh with one or with both parts of said two-part gear to provide a one-way or a two-way drive for the vehicle.

7. In a vehicle transmission, a drive shaft, a transmission shaft, a countershaft, a two-part gear on said drive shaft, one part of said two-part gear being integral with said drive shaft, one-way drive means between the other part of said two-part gear and said drive shaft, and a gear slidably but non-rotatably mounted on said countershaft and adapted to mesh with one or with both parts of said two-part gear to provide a one-way or a two-way drive for the vehicle.

8. In a vehicle transmission, a drive shaft, a transmission shaft, a countershaft, a two-part gear on said drive shaft, one-way drive means between one part of said two-part gear and said drive shaft, and a gear slidably but non-rotatably mounted on said countershaft, stop means for limiting the motion of said last named gear to two positions, said gear being adapted to mesh with one or with both parts of said two-part gear to provide a one-way or a two-way drive for the vehicle.

9. In a vehicle transmission, a drive shaft, a transmission shaft, a countershaft, a two-part gear on said drive shaft, one-way drive means between one part of said two-part gear and said drive shaft, a gear slidably mounted on said transmission shaft, clutch teeth on the one-way driven part of said two-part gear, complementary clutch teeth on said gear mounted on said transmission shaft, to provide a direct driving connection between said one-way driven part of said two-part gear and said gear on the transmission shaft, and a gear slidably but non-rotatably mounted on said countershaft and adapted to mesh with one or with both parts of said two-part gear to lock said parts together to provide a one-way drive for said vehicle or to release said one-way driven part from said other part to provide a two-way drive for the vehicle.

10. In a vehicle transmission, a drive shaft, a transmission shaft, a countershaft, a two-part gear on said drive shaft, one-way drive means between one part of said two-part gear and said drive shaft, a gear having a groove therein slidably but non-rotatably mounted on said countershaft, and a shifter fork actuated by an independent control for sliding said gear on said countershaft, said gear being adapted to mesh with one or with both parts of said two-part gear to provide a one-way or a two-way drive for the vehicle.

11. In a vehicle transmission, a pair of aligned shafts, a two-part gear on one of said shafts, one-way drive means between said shaft and one part of said two-part gear, a two-way drive between said shaft and the other part of said two-part gear, a countershaft, and means on said countershaft to selectively provide a one-way or a two-way driving connection between said aligned shafts.

12. In a vehicle transmission, a pair of aligned shafts, a two-part gear on one of said shafts, one-way drive means between one part of said two-part gear and said shaft, a two-way drive between the other part of said two-part gear and said shaft, a countershaft, and a gear slidable on said countershaft to selectively provide a one-way or a two-way driving connection between said aligned shafts.

Signed by me at South Bend, Indiana, this 5th day of February, 1932.

CHESTER H. FEHLBERG.